US008004303B2

(12) United States Patent
Hopper

(10) Patent No.: US 8,004,303 B2
(45) Date of Patent: Aug. 23, 2011

(54) METHOD AND SYSTEM FOR MEASURING FILM STRESS IN A WAFER FILM

(75) Inventor: Peter J. Hopper, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 107 days.

(21) Appl. No.: 12/315,933

(22) Filed: Dec. 8, 2008

(65) Prior Publication Data

US 2010/0141292 A1 Jun. 10, 2010

(51) Int. Cl.
*G01R 31/02* (2006.01)
(52) U.S. Cl. .................................................. 324/762.01
(58) Field of Classification Search ........................ None
See application file for complete search history.

(56) References Cited

U.S. PATENT DOCUMENTS 5,227,641 A * 7/1993 Cheng ...................... 250/559.23
5,578,981 A * 11/1996 Tokuda ......................... 336/171
5,979,244 A * 11/1999 Michaelis ....................... 73/800
6,156,623 A * 12/2000 Hendrix et al. ............... 438/457
6,514,835 B1 * 2/2003 Hendrix et al. ............... 438/457
6,750,152 B1 * 6/2004 Christenson et al. ............. 438/8
7,373,833 B2 * 5/2008 Hopper et al. .................. 73/724
7,468,899 B1 * 12/2008 Hopper et al. ................ 363/147
7,705,411 B2 * 4/2010 Smeys et al. .................. 257/415
2004/0195606 A1 * 10/2004 Basceri ......................... 257/296
2005/0161818 A1 * 7/2005 Basceri ......................... 257/751
2006/0278009 A1 * 12/2006 Hopper et al. .................. 73/724
2009/0029533 A1 * 1/2009 Fortin et al. ................... 438/482
2009/0038142 A1 * 2/2009 Hopper et al. ............... 29/602.1
2009/0094818 A1 * 4/2009 Smeys et al. ................ 29/602.1
2009/0160592 A1 * 6/2009 Hopper et al. .................. 336/83

FOREIGN PATENT DOCUMENTS

JP 05045237 A * 2/1993
JP 06036934 A * 2/1994

OTHER PUBLICATIONS

Mutsukura, Translation of JP 05-045237, Feb. 1993.*

* cited by examiner

*Primary Examiner* — Jermele M Hollington
(74) *Attorney, Agent, or Firm* — Jurgen K. Vollrath

(57) ABSTRACT

In a MEMS wafer, film stresses are measured by placing an inductor array over or under the wafer and measuring inductance variations across the array to obtain a map defining the amount of bowing of the wafer.

18 Claims, 2 Drawing Sheets

METHOD AND SYSTEM FOR MEASURING FILM STRESS IN A WAFER FILM

FIELD OF THE INVENTION

The invention relates to wafer level films and the stresses introduced by such films

BACKGROUND OF THE INVENTION

Like other integrated circuit structures, micromechanical systems (MEMS) are also commonly formed on a silicon substrate, however, in the case of MEMS the entire thickness of the wafer is used for forming the micromechanical structure. The MEMS are formed by repeated deposition of layers or films, followed by patterning and etching to define the desired circuits. The result is that the layers or films formed in MEMS technology are typically thicker than in non-MEMS integrated circuits, with the effect that the backend processing associated with MEMS results in bowing of the wafer, which in turn is associated with stress produced in the films. For instance Damascene processing and ferromagnetic laminations formed in MEMS technology can produce significant bowing of the wafer.

It is therefore important to be able to measure the stress in these films. One approach that has been used is to measure the amount of bow of the wafer by making use of a laser scanner. A laser beam is typically scanned across the wafer, incident at some angle, and the deflection of the laser is measured. A bowed wafer will deflect the laser beam differently to that of a flat wafer. Insofar as there are no features on the wafer that will cause the laser light to scatter, this approach works pretty well. However, when wafers are patterned to define certain features on the wafer, this approach becomes problematic. In particular, this prior art technique to measuring film stress is limited to measurements where the stressed film maintains a planar configuration in the sense that it does not involve deposition within trenches or on sidewalls of features.

The present invention seeks to address some of these issues.

SUMMARY OF THE INVENTION

According to the invention there is provided a method of measuring the film stress of a film deposited on a wafer, comprising placing an inductor array over or under the wafer and monitoring the eddie current coupling of the inductors in the array with the wafer. The inductors are preferably formed on a planar surface or flat platen such as a glass substrate, which may subsequently be encapsulated in glass to form a glass sandwich or flattened capsule. The array may be fabricated by metallization and contact printer lithography techniques. Contacts to the inductors in the array may be formed along the edge of the glass sandwich. The inductor array may be placed in contact with the upper or lower surface of the wafer. Monitoring the eddy current coupling typically comprises monitoring the current or voltage of the inductors in the array. The method may further comprise obtaining a map of the bow of the wafer as defined by the inductance of the inductors in the array. The method may also include relating the bow of the wafer to the film stress, e.g., by Stoney's equation.

Further, according to the invention, the inductor array may be implemented in a process tool for in situ stress measurement in films as they are deposited on a wafer.

Still further, according to the invention, there is provided an inductor array comprising a flat platen and multiple inductors formed on the platen by metallization and contact printer lithographic techniques, wherein the platen and inductors are encapsulated, e.g., in glass, to define a flattened capsule, contact to the inductors being provided along the edge of the capsule. The flat platen may be defined by a glass substrate. The capsule may be configured to be implemented in a processing tool to facilitate placing the capsule below or above a wafer during processing of the wafer.

DETAILED DESCRIPTION OF THE INVENTION

In order to measure stresses in films formed on semiconductor devices, especially in the case where the film is thick compared to the thickness of the wafer such as is the case of MEMS wafers, the present invention makes use of an inductor array to measure bowing of the wafer. This allows the measurements to be conducted even where the film does not define a purely planar structure but covers trenches or sidewall features.

Figure 1:
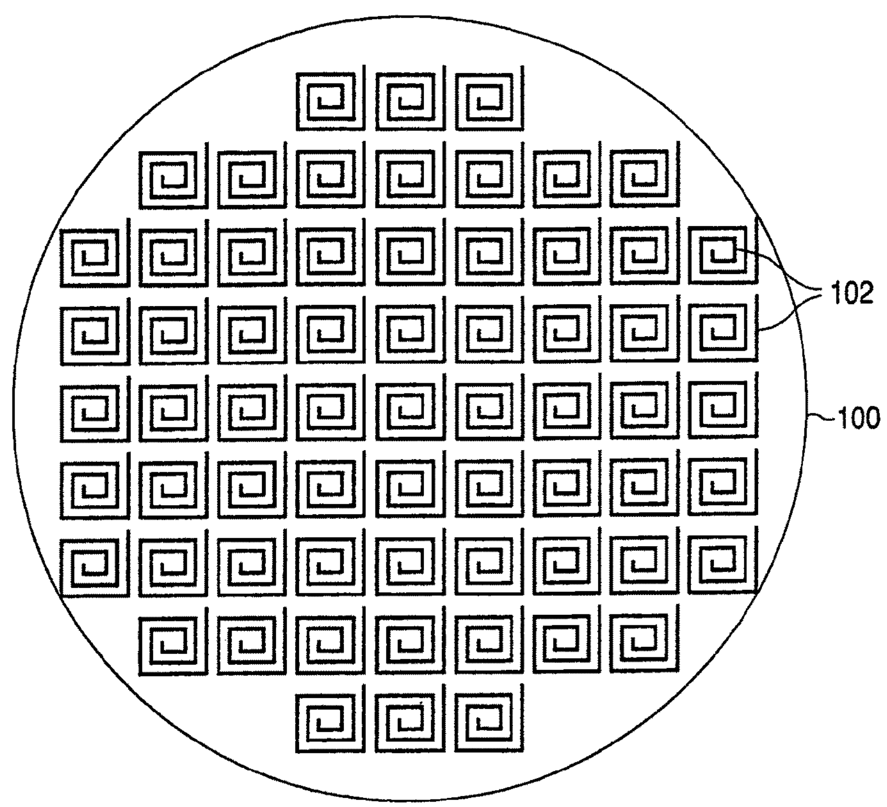
FIG. 1 is a plan view of an inductor array in accordance with one embodiment of the invention.

One embodiment of an inductor array of the invention is shown in plan view in FIG. 1. The array 100 of this embodiment comprises an array of planar inductors arrayed in a matrix that covers an area corresponding substantially to the area of a wafer to be tested. The inductors 102 of this embodiment are fabricated using standard metallization and contact printer lithography techniques onto a flat platen such as a thick glass substrate. The array is then encapsulated to define a flattened capsule with electrical conductors extending from the individual inductors 102 to the periphery of the capsule. The capsule in one embodiment is encapsulated in glass to define a glass capsule or glass sandwich. Electrical contacts to the electrical conductors are formed along the edge of the glass capsule or sandwich. The inductors are connected to a switching matrix to allow the inductance of each of the inductors to be individually measured. Since V=L di/dt, if a current of known frequency is fed into each inductor and the voltage monitored, the inductance can be determined for each inductor in the matrix.

Figure 2:
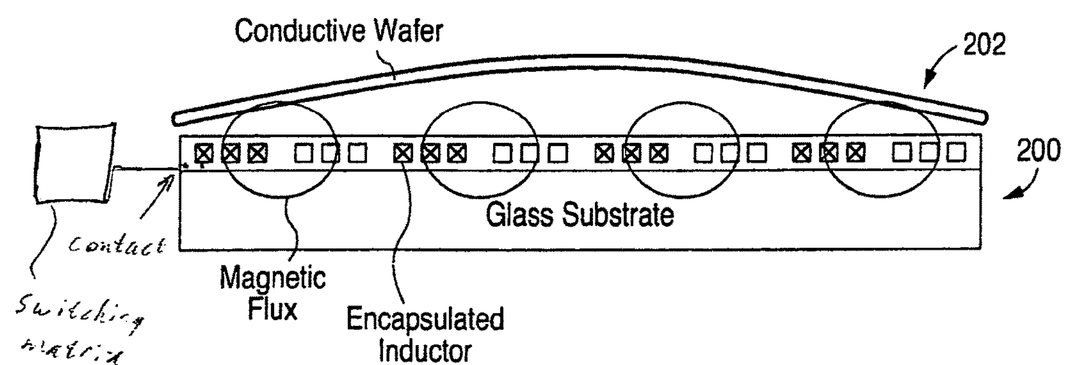
FIG. 2 is sectional side view representation of an inductor array placed underneath a wafer under test in accordance with one embodiment of the invention.

In accordance with the invention, an inductor array such as the array 100 is place over or under the wafer to be measured, typically by placing the encapsulated array against the wafer. One such approach is shown in FIG. 2 in which an encapsulated inductor array 200 of the invention is placed against the lower surface of a conductive wafer 202 to be tested. As shown in FIG. 2, the wafer 202 is bowed causing stress on the deposited film on the wafer 202. For purposes of this invention, the wafer with its one or more layers or films must be conductive. Therefore for ease of reference the films will be said to be deposited on a silicon wafer, while the entire structure with its one or more films will be referred to as a conductive wafer whether or not the film in question is itself conductive. Thus the underlying wafer may be conductive due to earlier metal layers being deposited, or the layer or film being monitored for stress may provide the conductive nature of the wafer. For instance, if inductors in the array are small (of the order of 100 um), then the inductor array will pick up the vicinity of the conductive wafer substrate only and not films deposited on top that are some 750 um away.

Since the wafer 202 is conductive, as an alternating current passes through the inductors, eddy currents are established in the overlying wafer or one or more of the films. However, due to the bowed configuration of the wafer 202 the amount of eddy current coupling for the various inductors in the array will vary depending on the distance between the inductor and the conductive wafer. This in turn will vary the current or voltage of the inductors. Thus a wafer map of the bow can be obtained by measuring the difference in current or voltage across the array. Further, since the change in bow is a function of the film stress, the stress can be calculated, for example using Stoney's equation. It will be appreciated that if the inductors in the array 200 are small (of the order of 100 um) the inductor array will pick up inductive changes close to the inductor array only. Thus, if the encapsulated array is placed against the lower surface of the wafer, only the inductive changes across the array that are within about 100 um of the array will be picked up, while the layers that are spaced further away from the array (approximately 750 um) will have little impact on the inductive changes. In such a case conductive structures in the wafer itself would have to support eddy currents in order for the array to pick up inductive changes.

Figure 3:
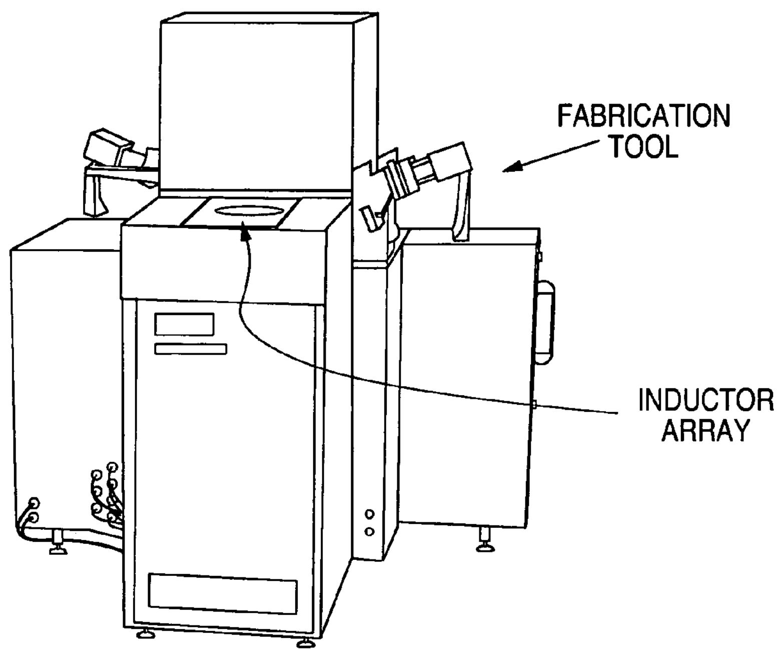
FIG. 3 shows a three dimensional view of a prior art process tool.

As a further aspect of the invention, an inductor array according to the invention is implemented into a fabrication tool such as that shown in FIG. 3 to facilitate in situ measurement of the stress in the films as they are deposited. For purposes of this invention, the measurement of film stress as the film is deposited includes measurement at any time while the wafer is still mounted in the processing tool.

While the present invention discussed a particular embodiment of the inductor matrix and how it is used, it will be appreciated that the inductor matrix (which may be encapsulated) could be made in different ways and placed in proximity to or in contact with the wafer to be tested in different ways without departing from the scope of the invention. For instance, the inductor array need not necessarily be encapsulated, especially where it may be connected to or placed into a housing on a processing tool.

What is claimed is:

1. A method of measuring the film stress of a film deposited on a silicon wafer, the combination defining a conductive wafer, comprising placing an inductor array that includes multiple inductors, over or under the conductive wafer, passing an alternating current through each inductor to establish eddy current coupling in the conductive wafer, and monitoring the eddy current coupling established by each of the inductors in the array.

2. A method of claim 1, wherein the inductors are formed on a flat platen.

3. A method of claim 1, further comprising encapsulating the platen to define a flattened capsule.

4. A method of claim 3, wherein the encapsulating comprises encapsulating the platen in glass to define a glass sandwich.

5. A method of claim 3, wherein the array is fabricated by metallization and contact printer lithography techniques.

6. A method of claim 3, wherein contacts to the inductors in the array are formed along the edge of the capsule.

7. A method of claim 2, wherein the array is placed in contact with the upper or lower surface of the conductive wafer.

8. A method of claim 1, wherein monitoring the eddy current coupling comprises monitoring current or voltage of the inductors in the array.

9. The method of claim 8, further comprising determining each inductor's distance from the wafer to define a bow of the conductive wafer.

10. A method of claim 9, further comprising relating the bow of the conductive wafer to the film stress.

11. A method of claim 10, wherein the relating of the bow to the film stress includes applying Stoney's equation.

12. A method of claim 1, further comprising implementing the inductor array in a process tool for in situ stress measurement of films.

13. A method of claim 10, further comprising implementing the inductor array in a process tool for in situ stress measurement of films.

14. An inductor array comprising a flat platen, and multiple inductors formed on the platen by metallization and contact printer lithographic techniques, wherein the platen and inductors are encapsulated to define a flattened capsule.

15. An inductor array of claim 14, wherein the capsule comprises a glass capsule.

16. An inductor array of claim 14, wherein contacts to the inductors are provided along the edge of the capsule.

17. An inductor array of claim 14, wherein the flat platen is defined by a glass substrate.

18. An inductor array of claim 14, wherein the capsule is configured to be implemented in a processing tool to facilitate placing the capsule below or above a wafer during processing of the wafer.

* * * * *